United States Patent [19]

DeMusis

[11] 4,128,929

[45] Dec. 12, 1978

[54] METHOD OF RESTORING WORN TURBINE COMPONENTS

[76] Inventor: Ralph T. DeMusis, 547 Foxon Rd., North Branford, Conn. 06471

[21] Appl. No.: 777,674

[22] Filed: Mar. 15, 1977

[51] Int. Cl.$^2$ .................... B23P 15/02; B23P 13/02
[52] U.S. Cl. .................... 29/156.8 B; 29/401 A; 51/217 R
[58] Field of Search .......... 29/156.8 B, 401 R, 401 A; 51/217 R, 217 P

[56] References Cited

U.S. PATENT DOCUMENTS

| | | | |
|---|---|---|---|
| 1,755,321 | 4/1930 | Hendrickson | 29/156.8 B |
| 2,565,925 | 8/1951 | Lombard et al. | 29/156.8 B |
| 3,127,710 | 4/1964 | Karbowski | 51/217 R |
| 3,331,166 | 7/1967 | Brenning | 51/217 R |
| 3,376,674 | 4/1968 | Ernesto | 51/217 R |
| 3,423,885 | 1/1969 | Crandall | 51/217 R |
| 3,818,646 | 6/1974 | Peterson | 51/217 R |
| 3,988,126 | 10/1976 | DeMusis | 51/217 R |
| 4,028,788 | 6/1977 | DeMusis | 29/156.8 B |

FOREIGN PATENT DOCUMENTS

| | | | |
|---|---|---|---|
| 140341 | 2/1951 | Australia | 29/156.8 B |
| 281518 | 6/1952 | Switzerland | 29/156.8 B |
| 327829 | 3/1958 | Switzerland | 29/156.8 B |

*Primary Examiner*—Lowell A. Larson
*Assistant Examiner*—Daniel C. Crane

*Attorney, Agent, or Firm*—H. Gibner Lehmann; K. Gibner Lehmann

[57] ABSTRACT

The method of restoring the worn edge surfaces of the shroud portion of a turbine component, such as a blade of the type having a ribbed mounting base at one end, which involves the steps of applying welding material to the worn edges of the shroud portion so as to build up the same beyond the dimensions of the shroud of a new component, and thereafter clamping the blade by its base in a fixture having a reference surface with a fixed position-relationship with respect to one edge of the shroud of a new blade of the type being refurbished when said new blade is similarly clamped in the fixture, and grinding off the added or overlay metal from the one edge of the built-up shroud until such edge is restored and duplicates the fixed relationship with respect to the reference surface. Thereafter the blade is clamped in a second fixture which has a supporting surface so arranged as to back up the one restored edge and thereby accurately position the blade with respect to the fixture, and then a remaining one of the built-up edges is restored. Finally, the blade is clamped in a third fixture having multiple surfaces backing up respectively the one restored edge and the remaining restored edge, while a third edge of the shroud is resurfaced. The method is characterized by high accuracy and good repeatability; excellent uniformity between successive units being refurbished thereby results.

17 Claims, 17 Drawing Figures

Fig. 9 Fig. 10 Fig. 11

METHOD OF RESTORING WORN TURBINE COMPONENTS

BACKGROUND

This invention relates generally to methods and means for refurbishing worn turbine components, and more particularly to methods and means for refurbishing the shrouds of worn turbine blades.

After a period of operation, the blades employed in turbine engines and the like tend to become worn, especially in the vicinity of the trailing edge of the airfoil surface and at the location of the shrouds which serve as mountings for ends of the blades. The circularly arranged blades of a turbine stage extend radially and are supported at their outer ends by an air seal ring which engages the blade shrouds, while at their inner ends the blades are clamped in a suitable hub.

In the past, when the shrouds of the blades have become worn, they were usually refurbished by building up one set of edges of all the blades, usually a corresponding set of edges which all faced in the same direction when the blades were assembled in radial fashion, and then ground down an extent so as to produce a surface on each set of edges which was slightly higher than that of the original. Other edges which were worn only minimally were allowed to remain so. The reasoning was that the lesser worn edges could be used as a reference in providing an indication as to how much of the built-up edges should be removed.

Problems occurred when such procedures were employed, however. Ideally the shrouds were refurbished with respect to the stacking line of the blade, which is an imaginary line extending through a central portion of the blade longitudinally. When accurately restored with respect to this stacking line, the shrouds of the successive blades can nest with one another in the turbine rotor. However, improper build-up of material on one set of edges of the shrouds gave rise to dissymmetry of the shrouds with respect to these stacking lines, tending to forcibly shift the outer portions of the blades in a circumferential direction when the blades were installed. Since the inner, base portions of the blades were firmly held in the hub, there resulted undue stresses being developed in the airfoil structure; frequently this structure would crack transversely if the stresses which occurred were of sufficient magnitude. Such failures, due to imprecise refurbishing of the turbine blade shrouds, often had catastrophic results and accordingly could not be tolerated.

Where attempts were made to add welding material to all of the edges of the shroud, accurate refinishing of these built-up edges was difficult to achieve since there was no reference on the built-up blade by which to gauge the first grind. Frequently the airfoil structure of the blade was worn, and thus any attempt to use this airfoil as a reference in making the first grind on the built-up shroud would result in imprecise restoration, leading to further problems when the blades were reinstalled in the turbine.

SUMMARY

The above disadvantages and drawbacks of prior methods and means for refurbishing turbine blades are obviated by the present invention which has for an object the provision of a novel and improved method and means for refurbishing the shroud of a turbine component such as a blade, the method being simple to carry out and providing a highly reliable refurbished product which meets the strict standards of usage required by turbine components. Still another object is the provision of a method and means as above, which produce refurbished blades of high precision, closely duplicating the characteristics and dimensions of new parts. Yet another object is the provision of a method and means which produce blades of high uniformity from unit to unit, and which can maintain such uniformity even over extended periods of time. Accordingly, undue stresses in the blades, resulting from imprecise or sloppy refurbishing operations, is virtually eliminated, and the reliability of the resulting turbine assembly incorporating the refurbished blades is thereby enhanced.

Yet another object of the invention is the provision of a series of novel and unique clamping fixtures for use in carrying out the above method, the fixtures being simple in construction, and providing an especially accurate and precise positioning of the blade, which is necessary for critical finishing operations normally associated with such turbine components.

Still another object of the invention is the provision of a series of clamping fixtures in which the blade can be readily installed with a minimum of effort and wherein no judgment is required on the part of the operator, for effecting proper seating in the respective fixture. As a result, operator-related error is virtually eliminated.

The above objects are accomplished in one aspect of the invention, by a novel method for restoring the worn edges of the shroud of a turbine component such as a blade of the type having a mounting base portion at one end and a shroud at the other end, wherein the method includes the steps of building up the shroud of the worn blade by fusing metal to the worn portions thereof, and mounting the worn blade by its base portion in a fixture which includes a reference surface disposed so as to have a predetermined fixed parallel relationship with respect to one given edge of the shroud of a new blade where the latter is similarly mounted in the fixture. Thereafter portions of the added metal are removed from the corresponding edge of the built-up shroud of the worn blade until the corresponding edge essentially reproduces the fixed relationship with respect to the reference surface.

The objects are further accomplished in a method of restoring turbine blades of the type having a mounting base portion at one end and a shroud at the other end, which includes the steps of building up a multiplicity of edges of the shroud of the worn blade by fusing metal to worn portions thereof, mounting the worn blade by its base portion in a fixture associated with a surface grinder of the type having an abrasive member, bringing one built-up edge of the shroud into engagement with the abrasive member to restore the one edge to its original geometry with respect to the base portion of the blade, and thereafter mounting the worn blade in a second fixture and placing the same on a surface grinder of the type having an abrasive member. The second fixture includes a supporting surface adapted for direct engagement with the one restored edge of the shroud, and the step of mounting the worn blade in the second fixture comprises the step of resting the one restored edge directly on the supporting surface to thereby accurately position a remaining one of the built-up edges of the shroud with respect to the abrasive member of the second-mentioned surface grinder. Thereafter the said one remaining edge of the shroud is brought into engagement with the abrasive member of the second-mentioned surface grinder to remove carefully controlled amounts of the one remaining edge, so as to restore it to its original geometry with respect to the one restored edge of the shroud and with respect to the blade base.

The above objects are further accomplished by a simple and unique clamping fixture adapted for use with a surface grinder apparatus of the type having an abrasive member and a work supporting table, the fixture being adapted to hold a turbine blade of the type having a mounting base portion which has a series of parallel ribs on its opposite surfaces, a convex-concave airfoil portion, and a shroud, for enabling the shroud of the blade to be engaged by the abrasive member of the grinder. The clamping fixture secures the blade in novel positions with respect to the grinder table. One such fixture is characterized by a base, means on the base defining a resting surface for engagement with the surface of the work supporting table, means carried by the base and including a vise for clamping the base portion of a blade such that the parallel ribs thereof are disposed askew with respect to the table surface, shoulder means carried by the fixture base engageable with at least one edge of the shroud, for backing up the latter in a predetermined position with respect to the base, and adjustable means carried by the fixture base and engageable with the convex-concave airfoil portion of the blade, providing a supplemental back-up therefor, to support that end of the blade adjacent the shroud and thereby to enable an edge of the shroud opposite said one edge to be engaged by the abrasive member of the surface grinder as the fixture base is moved with respect to the abrasive member.

The invention further provides another clamping fixture adapted for use with a surface grinder apparatus of the type having an abrasive member and a work supporting table, the fixture being adapted to hold a turbine blade characterized by a mounting base portion having a series of parallel ribs on its opposite surfaces, and a shroud, while the latter is engaged by the abrasive member of the grinder. The fixture comprises a base, means on the base defining a resting surface for engagement with the surface of the work supporting table, means carried by the fixture base and engageable with at least one edge of the shroud, for supporting the latter on the base, means carried by the fixture base and engageable with a second edge of the shroud, for supplementing the support provided by the first supporting means, means carried by the base and including a clamping jaw engageable with still another edge of the shroud, to hold the latter tightly in a predetermined position on the base, and a cradle carried by the base, adapted to receive the mounting base portion of the blade.

In addition, there is provided means pivotally mounting the cradle to enable it to swivel within limits when the clamping jaw is tightened, thereby assuring that the cradle does not interfere with proper seating of the first mentioned supporting means and the supplementary supporting means on the respective edges of the shroud.

The arrangement is such that the blade can be readily installed on the fixtures with a minimum of effort; in addition, errors in the finished product resulting from operator-related judgments are virtually eliminated.

The method and means as above set forth are seen to be extremely simple, while providing excellent uniformity and repeatability between different blades of the same type. As a consequence, there is thus eliminated from the turbine assembly all stresses in the airfoil surfaces of the blades due to improper dimensioning of the shrouds thereof. The resultant blades can thereby meet the stringent requirements of usage set forth for new parts, at a fraction of the cost.

Other features and advantages will hereinafter appear.

In the drawings, illustrating various steps in the method of the invention and particularly showing the fixtures involved with carrying out the method.

Figures 1, 2, 3, 4, 7, 8:
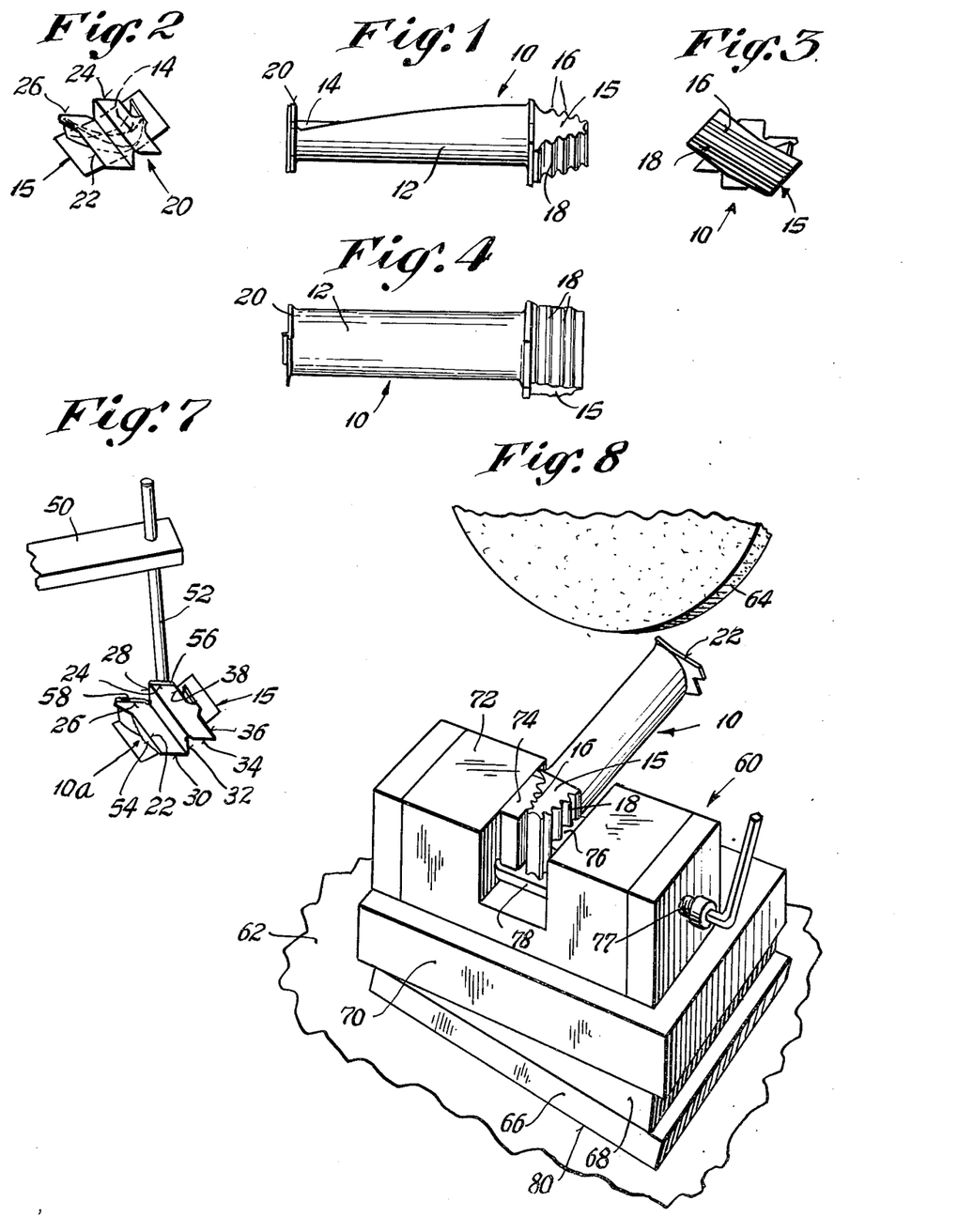
FIG. 1 is a front elevational view of a turbine blade of the type adapted to be refinished according to the method of the present invention.
FIG. 2 is a left end elevation of the blade of FIG. 1.
FIG. 3 is a right end elevation of the blade of FIG. 1.
FIG. 4 is a bottom plan view of the blade of FIG. 1.
FIG. 7 is a view similar to FIG. 2, except illustrating a worn turbine blade and showing a welding apparatus applying beads of welding material to the edge portions of the shroud of the blade so as to build up the same beyond the dimensions of a new part.
FIG. 8 is a perspective view of a first clamping fixture employed with a surface grinder, for removing carefully controlled quantities of built-up metal from one edge of the shroud of a turbine blade.

FIGS. 1-4 illustrate a turbine blade of the type adapted to be refurbished according to the methods and grinding fixtures of the present invention. The blade is generally designated by the numeral 10, and includes a convex airfoil surface 12, and a concave airfoil surface 14 (FIG. 2). As the blade is traversed lengthwise, the shape of the airfoil section changes, this giving rise to the double airfoil (dotted) outline shown in FIG. 2. The blade further comprises a mounting base portion 15 which is tapered as shown in FIG. 1, with a series of ribs 16 on one side and a second series of ribs 18 on the other side. The mounting base portion 15 is commonly known in the trade as a "fir tree". At the opposite end of the blade is a shroud of irregular outline, particularly shown in FIGS. 2 and 7. The shroud is indicated by the numeral 20, and comprises edge portions 22, 24 and 26. Refurbishing of the blade in accordance with the invention involves a build-up of these three edges 22, 24 and 26, followed by grinding operations on these same edges in a succession of grinding fixtures to be described below. As shown in FIG. 2, the edge 22 is seen to be disposed opposite the location of the leading edge of the airfoil of the blade. The remaining straight edge portions of the shroud 20 are indicated in FIG. 7 by the numerals 28, 30, 32, 34, 36 and 38. The showing of FIGS. 1-4 represents a new blade, whereas the blade illustrated in FIG. 7 has become worn through extended periods of use wherein the edges of the shroud have considerably smaller dimensions than those of a new part.

Referring to FIGS. 7-17 and in accordance with the present invention there is provided a novel and improved method for refurbishing the worn shroud of a turbine blade by which there is first added beads of welding material to the worn edges of the shroud to thereby build them up beyond their original dimensions, and thereafter the edges are ground one at a time, namely those edges indicated by the numerals 22, 24 and 26 in three separate grinding fixtures, the three fixtures being respectively illustrated in FIG. 8, FIGS. 9-11, and FIGS. 12-17.

Figures 5, 6:
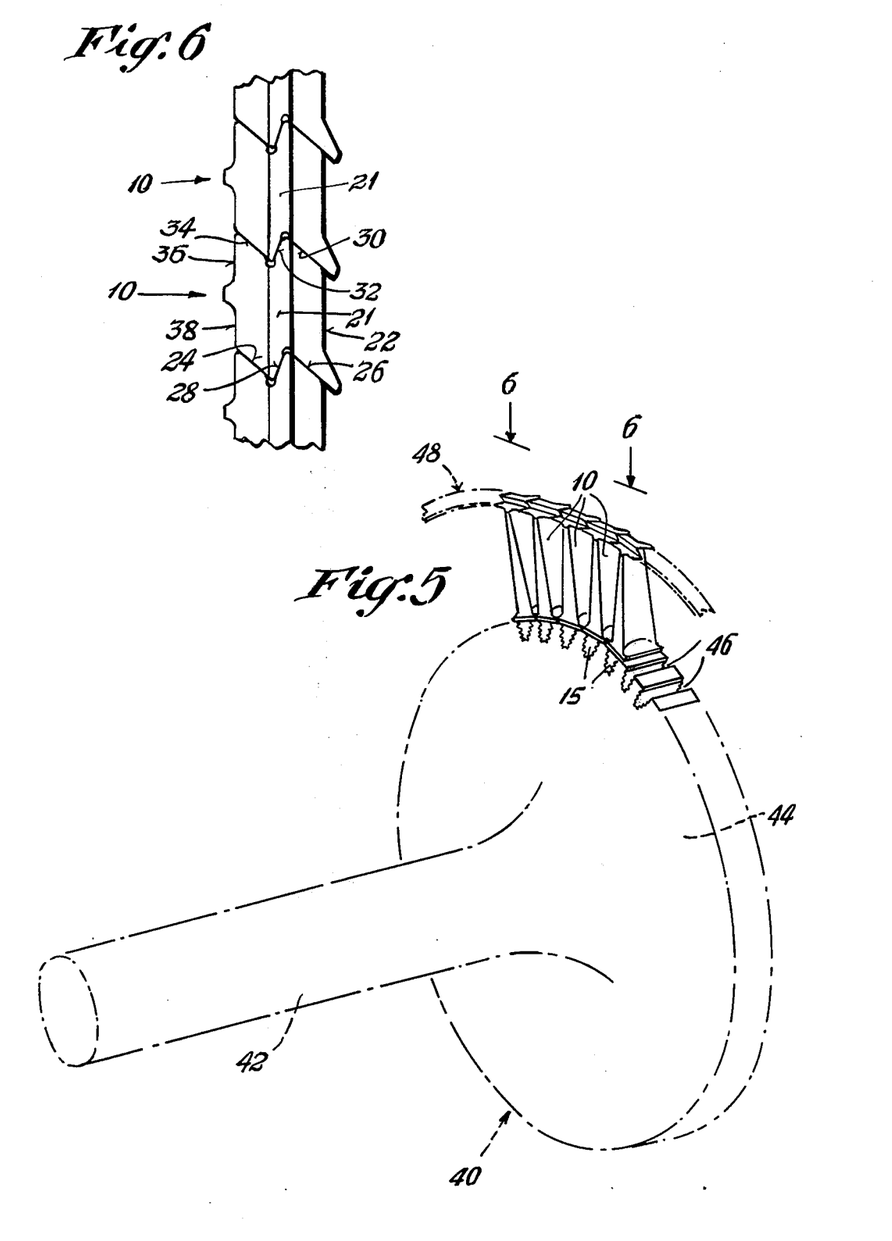
FIG. 5 is a perspective view of a turbine rotor incorporating a series of blades of the type shown in FIGS. 1-4.
FIG. 6 is a view taken on the line of 6—6 of FIG. 5.

FIG. 5 illustrates turbine rotor 40 in dotted outline, including a shaft 42 and a rotor hub 44, the latter having a series of radially extending recesses 46 in its periphery, the recesses being adapted to receive the ribbed base portions 15 of the turbine blades 10. A series of such blades 10 is illustrated in FIG. 5, occupying the positions they would appear in during normal operation of the turbine. As illustrated in FIG. 6, the shrouds of the blades are seen to nest with one another, and the ribs 21 on each shroud align with one another. A suitable sealing ring 48 extends around and engages the nested shrouds, thereby holding captive the blades 10 in their operative positions. The ring 48 is illustrated in FIG. 5.

FIG. 7 diagrammatically shows a welding apparatus including a conductor bar 50 and welding electrode 52 in the form of a welding rod. The welding rod is preferably constituted of a metal alloy known in the trade as Haynes Alloy #25 or #31, available commercially as type L-605. The rod has essentially the same composition as the alloy of which the turbine blades are constituted with the parts by weight being essentially as specified by the table below:

ESSENTIAL CHEMICAL ANALYSIS OF HAYNES ALLOY #25

Parts of weight:
1. Carbon—0.09
2. Silicon—0.22
3. Manganese—1.55
4. Phosphorus—0.018
5. Sulfur—0.007
6. Chromium—20.32
7. Nickel—10.56
8. Tungsten—14.30
9. Iron—2.25
10. Cobalt—50.685

FIG. 7 further shows a series of beads 54, 56 and 58 which have been added, by fusing, to the worn edges 22-26 respectively of the shroud in order to build them up, such that the built-up dimensions substantially exceed those of a new blade component. The remaining edges can also be built-up at the same time, as necessary, in the same manner illustrated in FIG. 7. Following the build-up of the edges 22-26 and in accordance with the invention, the blade 10 is then clamped in position on a grinding fixture particularly illustrated in FIG. 8, the fixture being designated by the numeral 60. The fixture is adapted to be used in a surface grinder or grinding machine having a substantially flat work supporting surface or movable table 62 and a power driven grinding wheel 64. The table 62 moves with respect to the wheel 64 of the grinder, in the usual manner. The fixture 60 includes a base 66 having a reference surface 80, an angle block 68, and a substantially flat support block 70 carrying a vise 72. The latter includes a fixed jaw 74 having a ribbed configuration to receive the ribs 16 of the blade base portion 15. A movable jaw 76 is provided, also of ribbed configuration, to clamp against the ribs 18 of the blade base portion 15. The jaw 76 includes an advancement screw 77. Disposed adjacent to the jaws 74, 76 is a stop or stop shoulder in the form of a block 78 which constitutes a positioning device against which the base 15 bears. With the blade 10 clamped in position on the fixture 60, the base 66 can be moved (with the table 62) such that the edge 22 engages the wheel 64. This results in removal of carefully controlled quantities of the welding bead 54 from the edge 22, such that the latter is effectively restored to a dimension closely resembling that of a new blade.

In accomplishing proper positioning between the blade 10 which is being refurbished and the wheel 64, it will be understood that a new blade 10 having the desired shroud dimensions is first mounted or clamped in place on the fixture 60 and the table 62 adjusted with respect to the grinding wheel 64 such that the latter just barely engages the edge 22. Subsequently, the new blade is removed, and the blade being refurbished substituted in the fixture, following which the grind is made. The taper of the wedge block 68 is determined experimentally, to bring the edge 22 of a new blade into parallelism with the table 62. Accordingly, by the invention there is established a fixed relationship between the edge 22 of the shroud of a new blade 10, and the bottom planar surface 80 of the base 66 of the fixture 60 such that when a worn blade having the edges of its shroud built-up by welding is placed in the fixture 60, and thereafter engaged by the wheel 64 as the fixture 60 is drawn past the wheel, the edge 22 will be ground down to the point wherein its dimensions are essentially the same as those of a new blade. Thus, there is established, between the reference surface 80 and the edge 22 the said fixed relationship. It is seen that this grinding operation does not depend on the dimensions of any of the remaining edges of the shroud, which are not of any value since they are either worn, or may have been built-up by welding for subsequent refinishing. Nor does it depend upon the dimensions of the concave or convex airfoil surface. Such surfaces are typically inaccurate after a blade has been in use, due to considerable wear and abrasion. Instead, the reference between the edge 22 and table 62 is established through the base 15 of the blade, which generally remains intact throughout the life of the blade and which retains its original geometry even after prolonged periods of use. Accordingly, an especially accurate dimensioning of the edge 22, closely resembling the geometry of the new blade, is possible.

Figures 9, 11:
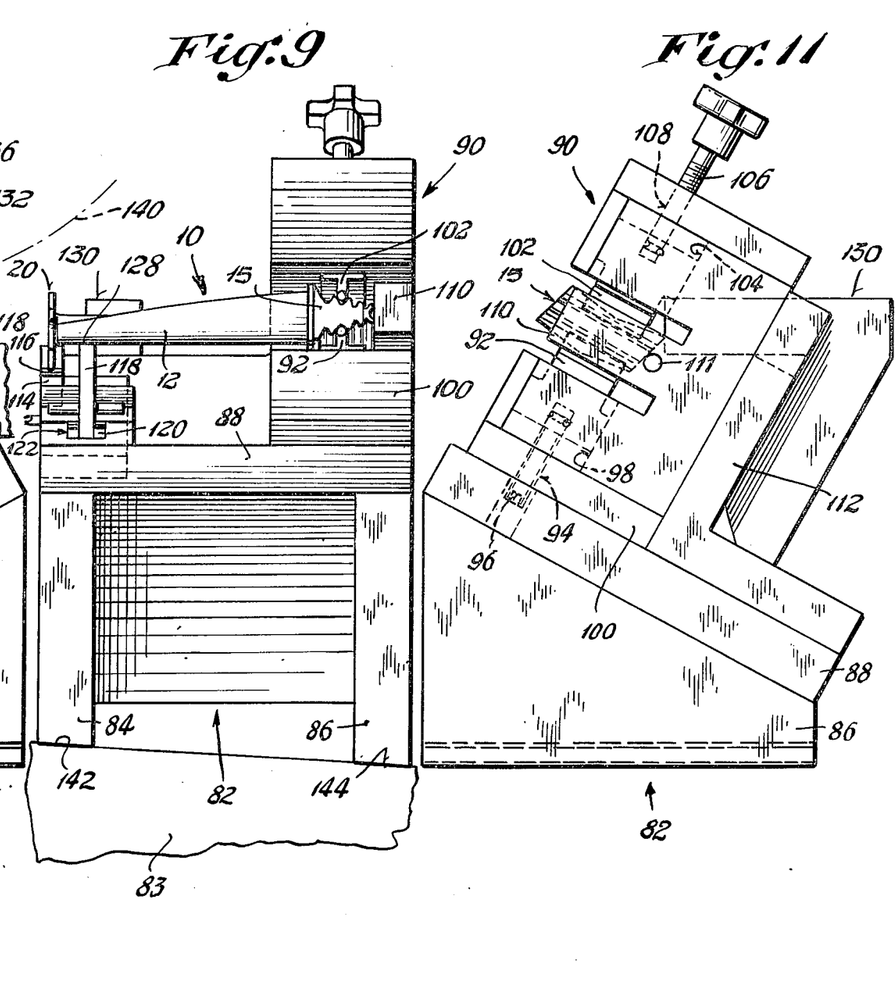
FIG. 9 is a side elevation of a second clamping fixture adapted for use with a surface grinder apparatus, wherein the blade is clamped in a position to enable carefully controlled quantities of built-up metal to be removed from a second or remaining edge of the shroud.
FIG. 11 is a rear elevational view of the fixture of FIG. 9.
Figure 10:
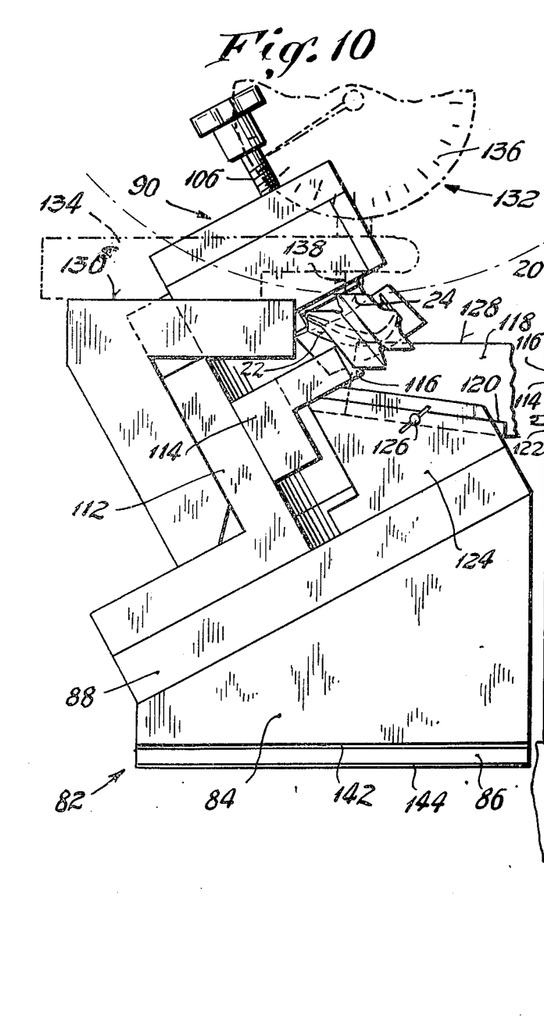
FIG. 10 is a front elevational view of the fixture of FIG. 9, and showing in dotted outline a grinding wheel engaging the said remaining edge, and also illustrating in dotted outline a gauge for monitoring the dimension of said remaining edge periodically during the grinding process.

As soon as the grinding operation illustrated in FIG. 8 has been completed, and in accordance with the present invention, the blade 10 is removed from the fixture 60 and placed in a second fixture particularly illustrated in FIGS. 9–11. The second fixture is generally designated 82, and includes a pair of upstanding wedge-shaped legs or support portions 84, 86 and a connecting yoke portion 88 on which there is carried a vise 90 having a base 100. The latter includes a first jaw 92 which is adjustable but which is adapted to remain stationary once a suitable predetermined position has been obtained. A threaded hole 94 in the base of the vise 90 includes an adjustment screw 96 by which the jaw 92 may be advanced and retracted. The latter is movably carried in suitable slide grooves 98 of the base 100 of the vise 90. In addition, a second, movable jaw 102 is provided, also carried in suitable slide grooves 104 in the vise base 100, and adjustable by means of positioning screw 106 carried in a threaded hole 108 in the base 100. As particularly shown in FIG. 9, the jaws 92, 102 have cross-sections substantially in the form of the letter "T", with the extremities which engage the base 15 of the blade having semi-cylindrical contact surfaces which engage adjacent pairs of ribs 16 or 18 of the base 15, to thereby hold the base captive once the screw 106 is advanced as in FIG. 9. In addition, a stop shoulder 110 and positioning pin 111 are provided, against which the base 15 bears, for effecting proper positioning thereof with respect to the fixture 82.

Referring again to FIG. 10, there is attached to the yoke portion 88 an intermediary member 112 which carries a shroud support member 114 having a tip portion 116 constituted of hardened steel. The latter is referred to in the appended claims as a supporting surface, and is adapted to bear against or provide a backing for the edge 22 which has just been refurbished in the fixture illustrated in FIG. 8. In addition, in order to effect additional support of the blade adjacent to the shroud 20, there is provided an adjustable slide 118 having a base 120 which is slidable in a groove 122 of an upstanding member 124 carried by the yoke 88. A set screw 126 is provided, engageable with the slide 118 for holding the latter in a predetermined fixed, adjusted position. As clearly illustrated in FIG. 9, the upper edge 128 of the slide is engageable with the convex side 12 of the blade, thus constituting a second supporting surface therefor, providing a supplemental back-up during the grinding operation to be described below.

Also carried by the intermediary member 112 is a gauging surface 130 for supporting a micrometer device 132 of the type illustrated in dotted outline in FIG. 10. The device includes a base 134, an indicator 136, and a feeler arm 138. The latter is adapted to engage the edge 24 of the shroud 20 periodically during the grinding operation, in order to monitor its dimension. The edge 24 is referred to in some of the appended claims as "said one remaining edge", and is also considered to be opposite the edge 22 of the shroud.

In operation, with the gauge 132 removed, the fixture 82 is placed on a suitable support surface of a surface grinder machine having a table 83, with the fixture being oriented generally as shown in FIG. 9. The leg portions 84, 86 are seen to have slightly different dimensions, such that when they are placed on the table 83 of the grinder, the yoke portion 88 will be at a slight angle with respect to the table surface.

The proper dimensions and configurations of the legs 84, 86 are determined experimentally, as is the proper position of the slide 118. Prior to grinding of a worn blade which has had certain of the edges of the shroud built-up by welding, a new blade is clamped in the fixture 82 of FIGS. 9–11. The table 83 on which the fixture 82 rests can now be raised with respect to the grinding wheel (shown in FIG. 10 in dotted outline) designated by the numeral 140, until it just barely engages the surface 24 of the new blade. The latter is then removed, and a worn blade having had its edge 24 built-up, and having had its edge 22 refurbished in the fixture shown in FIG. 8, is then substituted. Accordingly, there is thus established a fixed relationship between the edge 24 of the new blade and a reference or resting surface which in this case is a plane containing the bottom edges 142, 144 of the legs 84, 86 respectively. Restoration of the edge 24 of the worn blade is now readily accomplished by moving the fixture 82 (on the table) so as to bring the edge into engagement with the grinding wheel 140. When a point is reached wherein no further material is being removed, the edge 24 will closely resemble the edge of a new blade, particularly with respect to its dimension relative to the edge 22. During the grinding process, of course, the dimension of the edge 24 can be checked periodically by means of the gauge 132.

By the above arrangement it is seen that the second or a "remaining" edge 24 of the shroud has now been carefully restored to a predetermined dimension with respect to the first edge 22. Subsequent blades which have first been refurbished in the fixture of FIG. 8 can then be installed in the fixture 82 of FIGS. 9–11 and refurbished in the manner discussed above. Excellent uniformity and repeatability are thus realizeable between different units of the same type.

Referring to FIG. 7 again, following the refurbishing of the edge 24 in the fixture shown in FIGS. 9–11, the worn blade having a built-up edge 26 is transferred to a third fixture illustrated particularly in FIGS. 12–17. The fixture is generally designated by the numeral 146, and is used to clamp the blade in a position wherein the edge 26 (FIG. 7) can be ground down to thereby restore its dimension to that of a new blade.

Figures 12, 13, 14, 15, 16, 17:
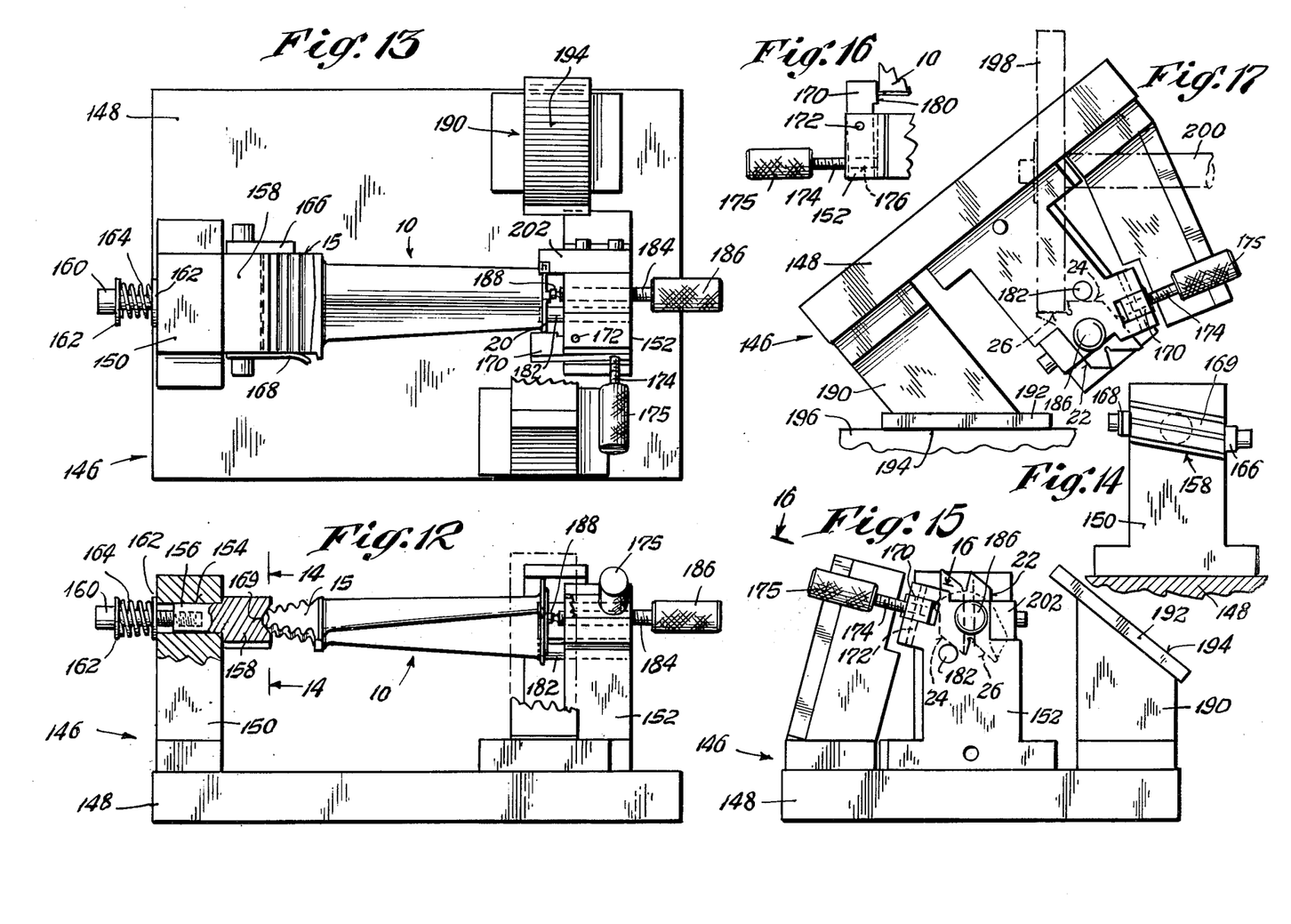
FIG. 12 is a front elevational view of a third fixture adapted for use with a surface grinder apparatus, wherein a blade is shown clamped in a position enabling carefully controlled quantities of built-up material to be removed from a third edge of the turbine blade shroud.
FIG. 13 is a top plan view of the fixture of FIG. 12.
FIG. 14 is a view taken on the line 14—14 of FIG. 12.
FIG. 15 is a right side elevation of the fixture of FIG. 12.
FIG. 16 is a fragmentary view of a clamp associated with the third fixture of FIGS. 12, 13, 14 and 15, taken on line 16—16 of FIG. 15.
FIG. 17 is a view like FIG. 16 except showing the third fixture in an operative position on a work support table, and showing a grinding wheel engaging said third edge of the shroud in order to restore it to its original dimensions.

In accordance with the present invention, this third fixture enables a blade to be clamped in a position wherein a third edge of the shroud of the blade can be resurfaced. In FIGS. 12 and 13, this third fixture 146 is seen to have a base comprising a mounting plate 148 having an upstanding end block 150 at one end, and a second upstanding end block 152 at its other end. The first end block 150 is shown in FIG. 12, and includes a transverse hole 154 in which there is received the boss 156 of a base carrier block or swivel cradle 158. The boss 156 includes a threaded hole which receives a cap screw 160, carrying a pair of washers 162 which are maintained spaced apart by means of a spring 164. This mounting arrangement for the carrier block 158 enables it to turn or swivel within limits. It is adapted to receive the base 15 of a turbine blade in the manner of FIG. 12. As shown in FIG. 13, a stationary guide arm or flange 166 is carried on the block 158, and a resilient arm or flange 168 is disposed at the opposite end of the block 158 for holding the base 15 captive. The face of the block 158 includes a hollow recess 169 to thereby provide a seat for the end of the base 15.

The second upstanding block 152 of the base carries a clamp comprising a pivotal jaw 170 which can swivel about a pin 172 in the block 152. Carried by the jaw 170 is an actuator screw 174 having a knurled knob portion 175. The screw 174 is received in a threaded hole 176 in the jaw 170. As particularly shown in FIG. 16, the jaw 170 includes a face 180 which bears against the protruding part of the shroud located between the edges 36 and 38 of the shroud (FIG. 7).

Also carried by the block 152 is a hardened steel pin 182 constituting a supporting surface for the edge 24 of the shroud, (which has been refurbished in the fixture of FIGS. 9–11) when the blade is clamped in position as shown. A second screw 184, constituting a clamping screw and having a knurled knob 186, is carried in the block 152 of the base. It has a hardened steel end piece 188 secured thereto. The piece 188 bears against the rib 21 of the shroud (FIG. 6) when the screw 184 is tightened.

In FIGS. 13 and 15, a supplementary support surface is provided, in the form of a block 202, constituting a shoulder on which the restored edge 22 of the blade can rest. In some of the appended claims, the pin 182 is referred to as a supporting surface which backs the edge 24 (the "remaining" edge), and the block 202 referred to as a supplementary support surface which backs the edge 22 (the "one" edge).

Also carried by the base is a third upstanding block 190 on which there is disposed an end plate 192 having a substantially flat reference surface 194. The arrangement is such that the fixture 146 can be turned from the position of FIG. 15 through an angle of 135° to the position of FIG. 17, and the reference surface 194 set upon a table or support 196 of a grinding machine. The machine includes a grinding wheel 198 shown in FIG. 17 in dotted outline, having a shaft 200 driven by suitably powered means (not shown). In this third fixture, there is thus established a predetermined fixed relationship between the reference surface 194 and the edge 26 of a new blade.

In use, a new blade 10 is first clamped in position on the fixture 146 and the fixture thereafter placed with its reference surface 194 resting on the table 196. Subsequently, with the grinding wheel 198 not running, the position of the table can be adjusted such that it barely engages the edge 26 of the new blade as illustrated in FIG. 17. The blade to be refurbished, having a built-up edge 26 then substituted for the new blade, and the edge 26 ground down until a point is reached wherein no further material is being removed from the edge. By such an arrangement, a dimension of the refurbished edge 26 will closely resemble that of a new blade, and the relationship (both angular and dimensional) with respect to the previously refurbished edges 22 and 24 will closely duplicate that of a new blade component.

By the above arrangement involving three fixtures, namely that of FIG. 8, that of FIGS. 9–11 and that of FIGS. 12–17, there is established a very precise, highly uniform and highly accurate and repeatable relationship between the stacking line of the turbine blade and the shroud edges 22, 24 and 26, as well as between the shroud edges themselves. Following the refurbishing of these three edges, any remaining edges requiring reconstruction or repair can be readily refurbished in different clamping fixtures (not shown). It is noted that the edge 22 is first refurbished and restored with respect to the base 15 of the blade. Thereafter, in the fixture of FIGS. 9–11 the blade is clamped by its base, a portion of the refurbished edge 22 is rested upon the supporting surface 116 in effecting proper dimensioning of a second or a remaining edge, namely that indicated by the numeral 24. Simultaneously, the convex face 12 of the blade is supported at a location adjacent the shroud 20 on a second supporting surface, in the form of the slide 118. The vise jaws 92, 102 are elongate and disposed at an angle with respect to the table 83, such that the base portion 14 of the blade is skewed with respect thereto, and the edge 24 is generally parallel to the table, so as to remain tangent to the grinding wheel 140 during its engagement therewith. Thereafter, the third fixture, illustrated in FIGS. 12–17 clamps the blade by its base portion 15 and also employs the refurbished edge 24 which was restored in the fixture of FIGS. 9–11 in accomplishing a refurbishing of the edge 26. The supporting surface, in the form of the pin 182, backs this refurbished edge 24 when the latter rests on the pin, and the supplementary support surface, comprising the block 202, tightly engages the restored edge 22 when the screw 174 is turned to actuate the jaw 170.

Prior to the present invention, the shrouds of such blades have been built-up by welding, and the grinding procedure carried out without regard to precise refinishing with respect to the blade stacking line. Accordingly, the dimensions of the shroud of a refurbished component, as well as the dimensional relationship of the shroud to the stacking line, was sometimes quite different from those proportions characterizing a new blade. Accordingly, substitute parts often did not fit well in original equipment, and excessive stresses frequently developed in the airfoil surface of the blade, resulting from compound errors in the dimensions of the shrouds of the stacked blades. This can be appreciated from an inspection of FIGS. 5 and 6 wherein it can be seen that close tolerances are required in order to enable all the turbine blades to nest properly, since such blades are secured not only by their bases, but also by their nesting shrouds.

It is seen that the present invention provides refurbished blades which closely resemble the dimensions of new parts, and there is thus insured high reliability and low stress operation over extended periods of use. The method of the invention is thus seen to provide a distinct advance and improvement in the technology of turbine blade repairs.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention, and certain portions of the invention can be used without others.

I claim:

1. The method of restoring turbine blades of the type having an airfoil portion, having a fir tree at one end of the blade and having at the other end of the blade a worn shroud adapted to be engaged by a sealing ring of the turbine, which includes the steps of:
   (a) building up that particular edge of the shroud of the worn blade which is disposed opposite to the leading edge of the airfoil portion, by fusing metal to the worn portions of said edge,
   (b) mounting the worn blade solely by its fir tree in a fixture which includes a vise, and which includes a reference surface disposed so as to have a predetermined fixed parallel relationship with respect to a corresponding edge of the shroud of a new blade if the latter is similarly mounted in said fixture, (c) said step of mounting the worn blade comprising engaging and clamping multiple surfaces of one side of the fir tree with one jaw of said vise and engaging and clamping at least one surface of the opposite side of the fir tree with the other jaw of said vise, and (d) removing portions of the added metal from the built-up edge of the shroud of the worn blade mounted in said fixture, until said built-up edge essentially attains the said fixed parallel relationship.

2. The method of claim 1, and including the further steps of:

(a) building up another edge of the shroud of said worn blade, (b) subsequently mounting the worn blade by its fir tree in a second fixture which includes another reference surface disposed so as to have a different predetermined fixed parallel relationship with respect to another given edge of the shroud of a new blade if such blade is similarly mounted in said second fixture, (c) backing up the previously-restored shroud edge, (d) backing up the airfoil portion of said worn blade, and (e) removing portions of the added metal from said other edge of the shroud of the worn blade while said worn blade is mounted in said second fixture, (f) removal of portions of said other edge being carried out until the same attains essentially the said different predetermined fixed parallel relationship.

3. The method of claim 2, and including the further steps of:

(a) building up a third edge of the shroud of said worn blade, (b) subsequently placing the worn blade in a third fixture which engages not only the fir tree but also both said edges of the shroud which had had metal removed, and (c) removing added metal from said third edge by an abrading tool having a predetermined relative movement with respect to said third fixture.

4. The method of claim 1, and including the steps of:

(a) placing the fixture on the table of a surface grinder, and (b) grinding off the said portions of added metal to remove the same.

5. The method of claim 2, and including the step of:

(a) gauging said different fixed relationship with a micrometer indicator, to determine the accuracy thereof.

6. The method of claim 2, and including the steps of:

(a) placing the said fixtures containing the worn blade on the table of a surface grinder one after the other, and (b) said removing step comprising grinding off the said portions of added metal.

7. The method of claim 1, and including the step of:

(a) clamping the fir tree of the worn blade in engagement with a stop on the fixture to effect the said mounting of the blade.

8. The method of restoring turbine blades of the type having an airfoil portion, having a fir tree at one end of the blade and having at the other end of the blade a worn shroud adapted to be engaged by a sealing ring of the turbine, which includes the steps of:

(a) building up a multiplicity of edges of the shroud of the worn blade by fusing metal to worn portions thereof, (b) mounting the worn blade solely by its fir tree in a fixture associated with a surface grinder of the type having an abrasive member, (c) bringing that one built-up edge of the shroud which is opposite to the location of the leading edge of the airfoil portion into engagement with said abrasive member to restore said one edge to its original geometry with respect to the fir tree of the blade, and (d) thereafter mounting the worn blade in a second fixture and placing the same on a surface grinder of the type having an abrasive member, said second fixture having a supporting surface adapted for direct engagement with said one restored edge of the shroud, (e) said step of mounting the worn blade in the second fixture comprising resting said one restored edge directly on said supporting surface to thereby accurately position a remaining one of the built-up edges of the shroud with respect to the abrasive member of the second-mentioned surface grinder, and (f) bringing the said one remaining shroud edge into engagement with the abrasive member of the second-mentioned surface grinder to remove carefully controlled amounts of the said one remaining shroud edge so as to restore it to its original geometry with respect to the said one restored edge of the shroud and with respect to the fir tree of the blade.

9. The method of claim 8, wherein the airfoil portion has a convex airfoil face, and including the further step of:

(a) supporting the convex face of the blade at a location adjacent the shroud on a second supporting surface, simultaneously with said resting step, thereby providing additional support for the blade while the removal of the controlled amounts of the said one remaining edge is occurring.

10. The method of claim 9, wherein the blade fir tree has a ribbed configuration and wherein the surface grinder associated with the second fixture includes a work table, and wherein the abrasive member comprises a grinding wheel, and including the further step of:

(a) clamping the ribbed fir tree in a vise on the second fixture, said vise having elongate clamping jaws which are disposed at an angle with respect to the work table such that the fir tree is skewed with respect thereto and the said one remaining edge of the shroud is generally parallel to the surface of the work table, whereby when the second fixture moves with respect to the work table, the said one remaining edge will be positioned generally tangent to the grinding wheel during its engagement therewith.

11. The method of claim 8, wherein the second fixture includes a gauging surface having a fixed relationship with respect to that edge of the shroud of a new blade which corresponds to the said one remaining edge of the worn blade, and including the further step of:

(a) periodically placing a micrometer gauge of the type having a feeler arm on the gauging surface, with the feeler arm engaging said one remaining edge of the worn blade, to monitor the dimension thereof and thus aid in the determination of how much material has been removed from the said one remaining edge of the worn blade.

12. The method as set forth in claim 8, and including the further step of:
   (a) mounting the blade in a third fixture of a surface grinder, said third fixture having a supporting surface adapted for engagement with the said restored remaining edge,
   (b) the step of mounting the blade in the third fixture comprising the step of resting the said restored remaining edge on the supporting surface of the third fixture to thereby accurately position the shroud of the blade with respect to the fixture, and thereafter
   (c) bringing a third built-up edge of the shroud into engagement with the abrasive member of the surface grinder to thereby remove carefully controlled amounts of said third edge and thus restore it to its original geometry with respect to said one restored edge of the shroud and said remaining restored edge of the shroud.

13. The method as set forth in claim 12, wherein said third fixture includes a supplementary support surface adapted for engagement with said one restored edge of the shroud, and wherein the step of mounting the blade in the third fixture comprises the step of:
   (a) resting the said one restored edge against the supplementary support surface to thereby accurately position the shroud of the worn blade with respect to the fixture.

14. The method of claim 13, wherein said third fixture includes a clamp, and wherein the step of mounting the blade in the third fixture comprises the step of:
   (a) clamping said one restored edge of the shroud against said supplementary support surface, to thereby hold the shroud captive in the third fixture.

15. The method of claim 12, wherein said third fixture comprises a clamping screw, and wherein the step of mounting the blade in the third fixture comprises the step of:
   (a) tightening the clamping screw into engagement with one of the broad end surfaces of the shroud to thereby hold the blade captive on the fixture.

16. The method of restoring turbine blades of the type having a fir tree at one end and a shroud at the other end, said shroud being adapted to be encircled by a sealing ring of the turbine, which includes the steps of:
   (a) building up a multiplicity of edges of the shroud of the worn blade by fusing metal to worn portions thereof,
   (b) mounting the worn blade by its fir tree in a fixture associated with a surface grinder of the type having an abrasive member,
   (c) bringing one built-up edge of the shroud into engagement with said abrasive member to restore the one edge to its original geometry with respect to the fir tree of the blade, and
   (d) thereafter mounting the worn blade in a second fixture and placing the same on a surface grinder of the type having an abrasive member, said second fixture having a supporting surface adapted for direct engagement with said one restored edge of the shroud,
   (e) said step of mounting the worn blade in the second fixture comprising the step of resting said one restored edge directly on said supporting surface to thereby accurately position a remaining one of the built-up edges of the shroud with respect to the abrasive member of the second-mentioned surface grinder,
   (f) bringing the said one remaining edge into engagement with the abrasive member of the second-mentioned surface grinder to remove carefully controlled amounts of the said one remaining edge so as to restore it to its original geometry with respect to the said one restored edge of the shroud and with respect to the fir tree of the blade,
   (g) mounting the blade in a third fixture of a surface grinder, said third fixture having a swivel cradle and having a supporting surface adapted for engagement with the said restored remaining edge,
   (h) the step of mounting the blade in the third fixture comprising the step of resting the said restored remaining edge on the supporting surface of the third fixture to thereby accurately position the shroud of the blade with respect to the fixture,
   (i) the step of mounting the blade in the third fixture also comprising the step of inserting the fir tree of the worn blade in the swivel cradel so as to support that end of the blade while enabling the said restored remaining edge of the shroud blade to seat properly on the said supporting surface, and
   (j) bringing a third built-up edge of the shroud into engagement with the abrasive member of the third-mentioned grinder to thereby remove carefully controlled amounts of said third edge and thus restore it to its original geometry with respect to said one restored edge of the shroud and said remaining restored edge of the shroud.

17. The method of restoring turbine blades of the type comprising an airfoil portion, having a fir tree at one end of the blade and having at the other end of the blade a worn shroud adapted to be engaged by a sealing ring of the turbine, which includes the steps of:
   (a) building up a multiplicity of edges of the shroud of the worn blade by fusing metal to worn portions thereof,
   (b) mounting the worn blade solely by its fir tree in a fixture associated with a surface grinder of the type having an abrasive member,
   (c) bringing a built-up edge of the shroud, which extends transversely with respect to an end configuration of the fir tree, into engagement with said abrasive member to restore said edge to its original geometry with respect to the fir tree of the blade, and
   (d) thereafter mounting the worn blade in a second fixture and placing the same on a surface grinder of the type having an abrasive member, said second fixture having a supporting surface adapted for direct engagement with said one restored edge of the shroud,
   (e) said step of mounting the worn blade in the second fixture comprising resting said one restored edge directly on said supporting surface to thereby accurately position a remaining one of the built-up edges of the shroud with respect to the abrasive member of the second-mentioned surface grinder, and
   (f) bringing the said one remaining shroud edge into engagement with the abrasive member of the second-mentioned surface grinder to remove carefully controlled amounts of the said one remaining shroud edge so as to restore it to its original geometry with respect to the said one restored edge of the shroud and with respect to the fir tree of the blade.

* * * * *